(12) United States Patent
Van der Steen (10) Patent No.: US 7,497,733 B1
(45) Date of Patent: Mar. 3, 2009

(54) SHIELDED CONNECTOR ADAPTED TO BE MOUNTED AT DIFFERENT PROFILE

(75) Inventor: Hendrikus P. G. Van der Steen, Den Dungen (NL)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/069,991

(22) Filed: Feb. 13, 2008

(51) Int. Cl.
*H01R 13/648* (2006.01)
(52) U.S. Cl. ......................................... 439/607; 439/71
(58) Field of Classification Search ................. 439/607, 439/609, 71
See application file for complete search history.

(56) References Cited

U.S. PATENT DOCUMENTS

| | | | |
|---|---|---|---|
| 7,147,481 B2 * | 12/2006 | Yang | 439/71 |
| 7,232,316 B2 * | 6/2007 | Chen | 439/71 |
| 7,241,160 B2 * | 7/2007 | Yang | 439/330 |
| 7,309,238 B2 * | 12/2007 | Yang | 439/71 |
| 2005/0153600 A1 * | 7/2005 | Lu | 439/607 |
| 2006/0063431 A1 * | 3/2006 | Yang | 439/607 |
| 2006/0105631 A1 * | 5/2006 | Yang | 439/607 |
| 2006/0216996 A1 * | 9/2006 | Chen | 439/607 |

* cited by examiner

*Primary Examiner*—T C Patel
*Assistant Examiner*—Harshad C Patel
(74) *Attorney, Agent, or Firm*—Wei Te Chung (57) ABSTRACT

A shield connector (1) for electrically connecting an electronic component to a printed circuit board (2) comprises a housing (10) configured by a first, second, third, and fourth sidewalls (101, 102, 103, 104) defining a receiving space (105) together, a pair of contact module (30) assembled on an opposite sidewalls of the housing (10), and a pair of soldering assemblies (50) detachable to the contact module. Said soldering assembly at least has a soldering member for electrical connected to a printed circuit board and an attached portion attaching to the contact module. Consequently, present electrical connector can fit in different mobile phones to meet different requirements thereof.

20 Claims, 11 Drawing Sheets

SHIELDED CONNECTOR ADAPTED TO BE MOUNTED AT DIFFERENT PROFILE

BACKGROUND OF THE INVENTION

1. Field of the Invention

The present invention relates to a shield connector, and more particularly to an electronic module connector for interconnecting an electronic module such as a camera module for use with a cellular phone or the like to an electrical member such as a printed circuit board. The connector further comprises a soldering assembly can be adapted to mount at different profile therein.

2. Description of the Related Art

Conventionally, electronic modules such as a camera module for use with a cellular phone are securely maintained in electrical connection with an electronic member such as a printed circuit board. Therefore, an electrical connector for the camera module, formed in a shape that allows for a secured insertion of the camera module, is pre-installed on the printed circuit board. Then, the camera module is inserted into the electrical connector to electrically engage therewith. Consequently, the camera module is electrically connected with the printed circuit board via the electrical connector.

With the development of society, a miniaturization of the electrical connector has become a trend. Therefore, a new type electrical connector is generated to meet the requirement, which can run through the printed circuit board. However, because of the limited space of the mobile phone, the printed circuit board sometimes needs to be disposed on the middle position of electrical connector when the space above the printed circuit board is equally to the space below thereof; or alternatively, the printed circuit board need to be disposed on an upper position of the middle part of the electrical connector when the above space of the printed circuit board is smaller than the below space thereof; and in this case, the printed circuit board need to be disposed on an below position of the middle part of the electrical connector when the above space is abundant than the below space thereof.

U.S. Pat. No. 7,147,510 issued to Asai on Dec. 12, 2006 discloses an electrical connector for related application comprising at least a housing, a plurality of terminal contacts, and at least a shield shell. Each terminal contact includes a retaining portion fixedly received in the sidewall of the housing, a contact portion extending above the bottom wall of the housing, and a soldering portion extending outwards of the housing. In addition, the soldering portion extends outwardly from a position on an upper side of the sidewall of the housing. Therefore, when the electrical connector is attached to the printed circuit board with the soldering portion of the terminal contact contacting to the pads formed on an opening edge of the printed circuit board, most of the part of the electrical connector is located below on the printed circuit board.

CN Pat. No. 2775870 issued to Gao on Apr. 26, 2006 discloses an electrical connector for related application comprising at least a housing, a plurality of terminal contact, and a shield shell covered on the housing. Similar to the terminal contact disclosed in the Asai'510 patent, said each terminal contact includes also a retaining portion fixedly secured on a sidewall of the housing with a contact portion arranged above a bottom wall of the housing, and a soldering portion extending from the middle of the sidewall of the housing to outside thereof. Consequently, when said electrical connector is soldered on the printed circuit board, half thereof exposed upper of the printed circuit board and half thereof exposed thereunder.

However, due to the different mounting requirements from the different the mobile phones, different electrical connectors are required to fit therewith according to the tailored requirements. Nevertheless, the existing electrical connector can only be attached to a particular mobile phone because it is intended to do so. It reduces flexibility to manufacture of the electrical connector and the assembly procedure of the mobile phone. Consequently, it is a desire to design an electrical connector that can fit with a different mobile phones.

Thus, there is a need to provide an improved shield connector that overcomes the above-mentioned problems.

BRIEF SUMMARY OF THE INVENTION

It is an object of the present invention to provide a shield connector with a soldering assembly adapted to be mounted at different profile to fit with different mobile phones.

In order to achieve the objective above, a shield connector in accordance with a preferred embodiment of the present invention at least comprises a housing configure with a base and periphery sidewalls, a plurality of terminal contacts attached to the periphery sidewall of the housing. Each terminal contact defines a contact portion so as to contact with the pads formed on a bottom wall of the camera module and a retaining portion assembled with a periphery sidewall of the housing. The shield connector further comprises a soldering assembly, each attached to a corresponding terminal contact. Said soldering assembly can be only a soldering element connected with the said terminal contact and soldering to the printed circuit board. While the soldering assembly can be composes of a metal member and a holding member thereof. Said metal member fixed in said holding member and together attached to the terminal contact. Therefore, the soldering assembly can be adjusted according to different height requirements to meet different demands of different mobile phones and do not need another electrical connector to meet the requirement.

Other objects, advantages and novel features of the invention will become more apparent from the following detailed description of the present embodiment when taken in conjunction with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like members in the figures and in which:

DESCRIPTION OF PREFERRED EMBODIMENT OF THE INVENTION

In the following detailed description, for purposes of explanation, numerous specific details are set forth in order to provide a thorough understanding of the present invention. It will be apparent, however, that the present invention may be practiced without these specific details. In other instances, well-known structures and devices are schematically shown in order to simplify the drawing.

A shield connector according to the present invention is applicable to an electronic apparatus such as digital cameras, PDAs (Personal Digital Assistants), PCs (Personal Computers), mobile phones or the like. In the preferred embodiment illustrated in FIGS. 1-8, the shield connector 1 is illustrated as to be used in a mobile handset (not shown) for connecting a camera module (not shown) to a PCB (not shown).

Figure 1:
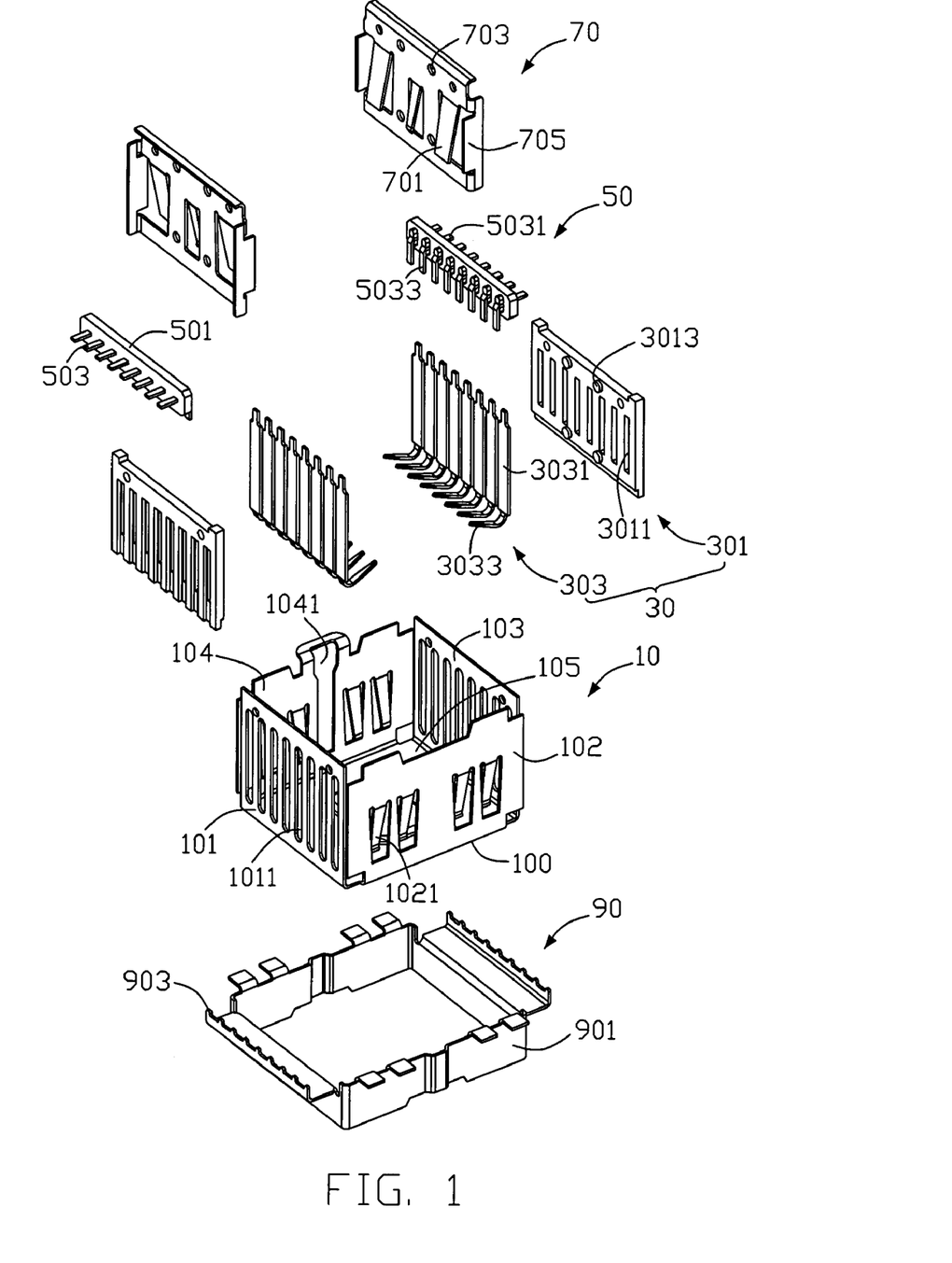
FIG. 1 is an exploded view of a shield connector of the present invention.

FIG. 1 is an exploded perspective view of the shield connector for receiving a camera module in the embodiment of this invention. In the figure, the reference numeral 10 denotes a housing made of a metal material. The reference numeral 30 denotes a pair of contact module. The reference numeral 50 denotes a pair of soldering assembly. The reference numeral 70 denotes a pair of shield piece made of metal material. The reference numeral 90 denotes a movable shell assembled on the outer surface of the housing.

Figure 2:
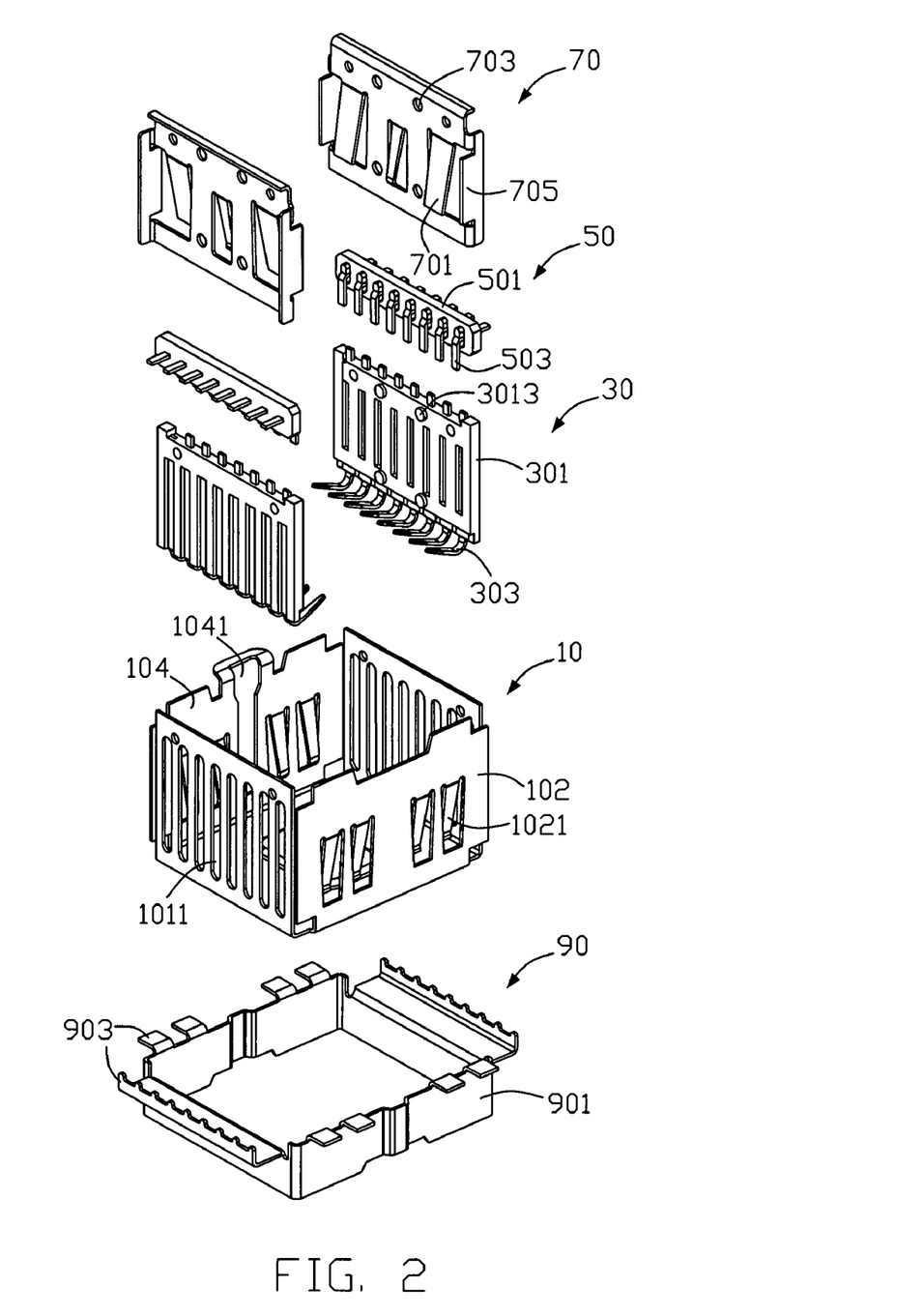
FIG. 2 is a partly assembled perspective view of the shield connector of the present invention, wherein the terminal contacts are assembled with the insulating sheet and the soldering member are hold in the hold member.
Figure 3:
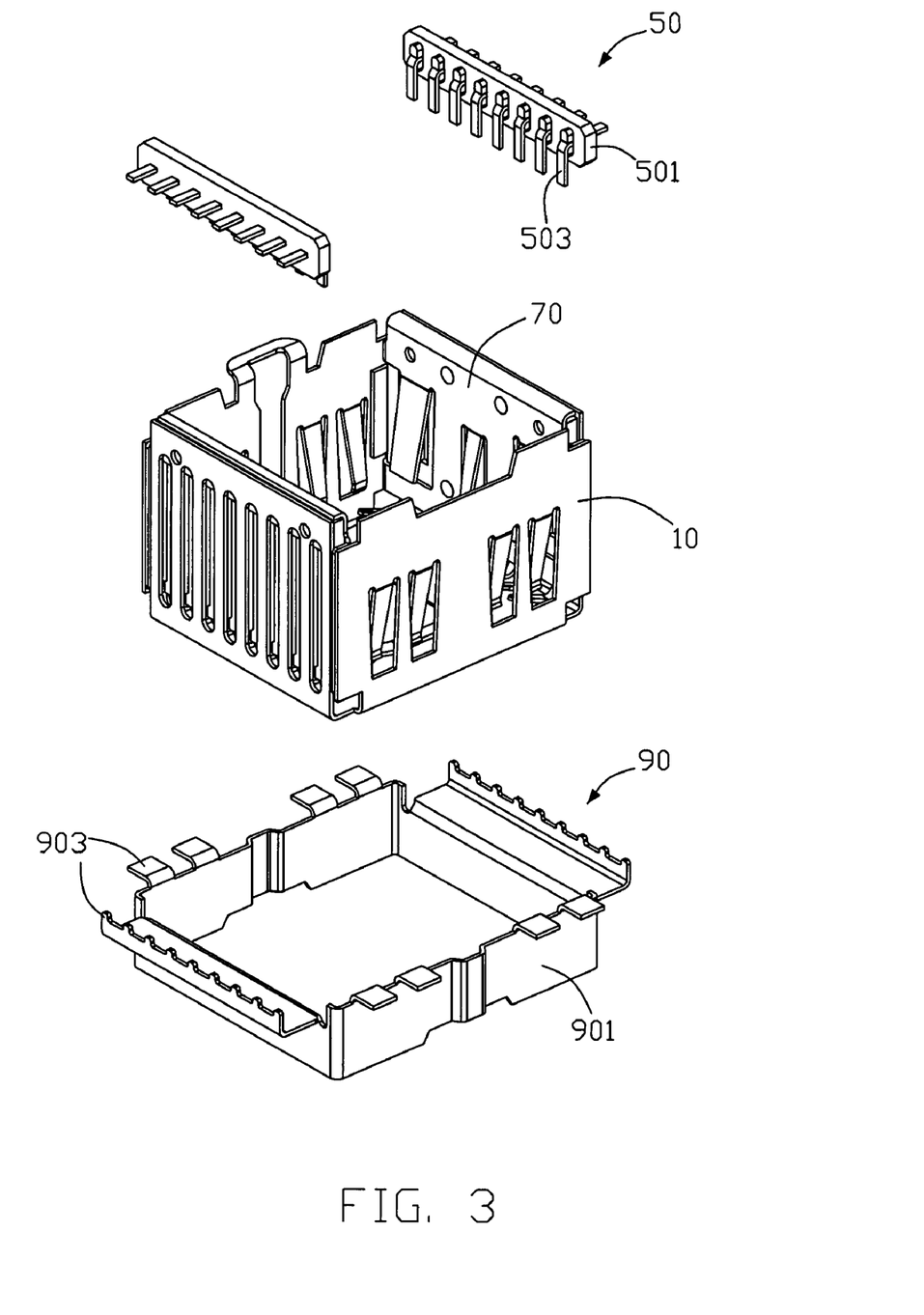
FIG. 3 is a partly assembled perspective view of the shield connector of the present invention, wherein the contact module and the shielded pieces are mounted into the housing.

As shown in FIGS. 1-3, the housing 10 includes a plane shaped bottom plate 100 and box shaped insulating member having surrounding wall plates 101, 102, 103, and 104. And said bottom plate 100 and the surrounding wall plate 101, 102, 103, and 104 together jointly defines a receiving space 105 to receive the camera module.

Also referring to the FIGS. 1-3, a plurality of narrow openings 1011 are defined in the surrounding wall plate 101, 103 at a predetermined interval and run through the inner surface to the outer surface thereof. Therefore, the soldering assembly 50 can be attached to the contact module 30 via said narrow openings 1011 when the contact module 30 assembled on the housing 10.

The surrounding wall plates 101, 102, 103, and 104 extend perpendicular from the edge portion formed on the bottom plate 100, respectively. A plurality of spring fingers 1021 is formed on the inner surface of the surrounding wall plate 102, 104 and extends into a center of the housing 10 so as to provide ground contact to the camera module. Wherein a window 1041 is defined in one surrounding wall plate 104 for engaging with a corresponding portion of the camera module. When the camera module is inserted into the housing 10 from above, the corresponding portion of the camera module protrudes outwardly via the window 1041 of the housing 10, by this arrangement, the camera module can be fitted into the housing 10 correctly.

Figure 4:
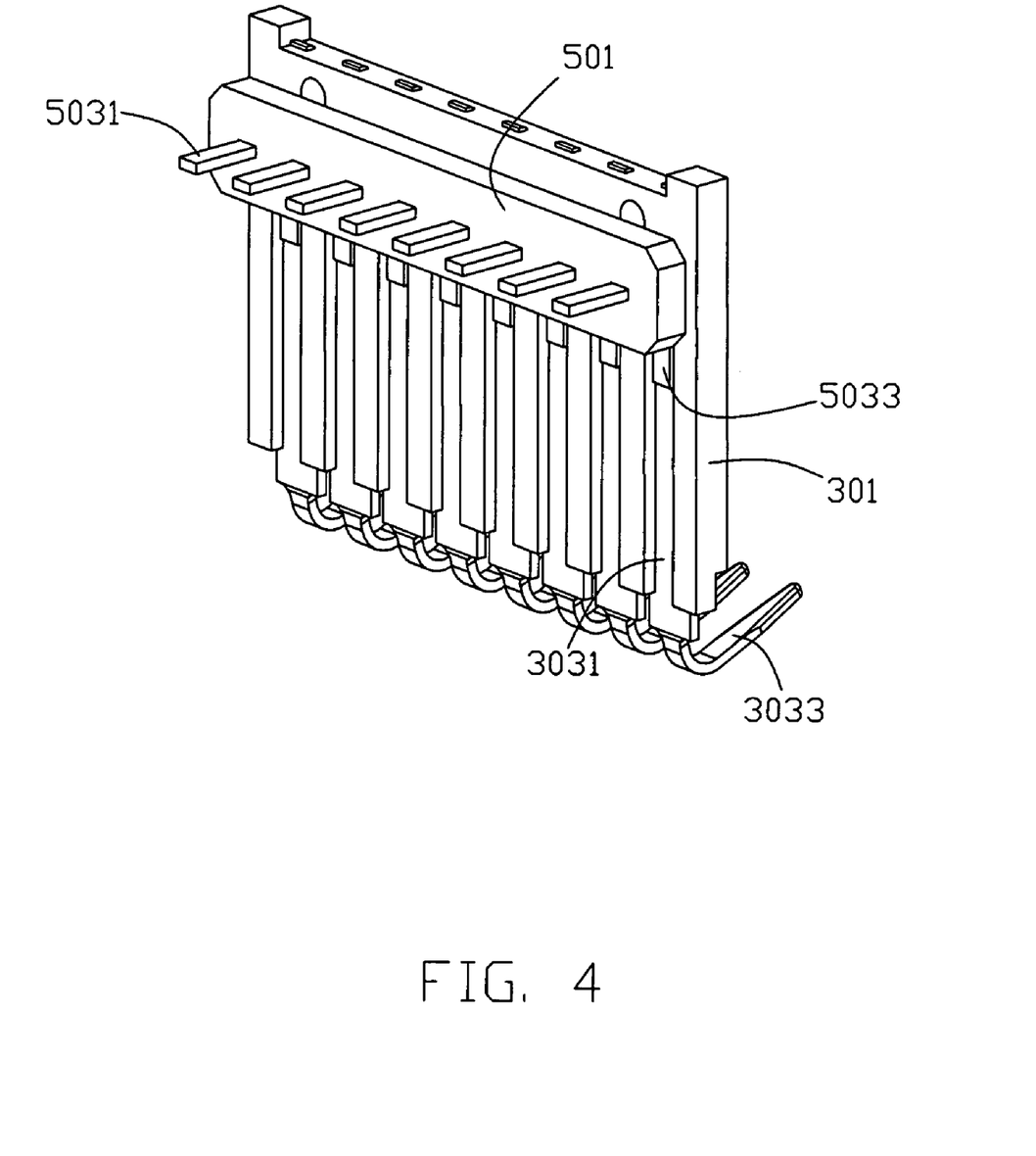
FIG. 4 is an assembled perspective view of the contact module and the soldering assembly of the present invention.
Figure 5:
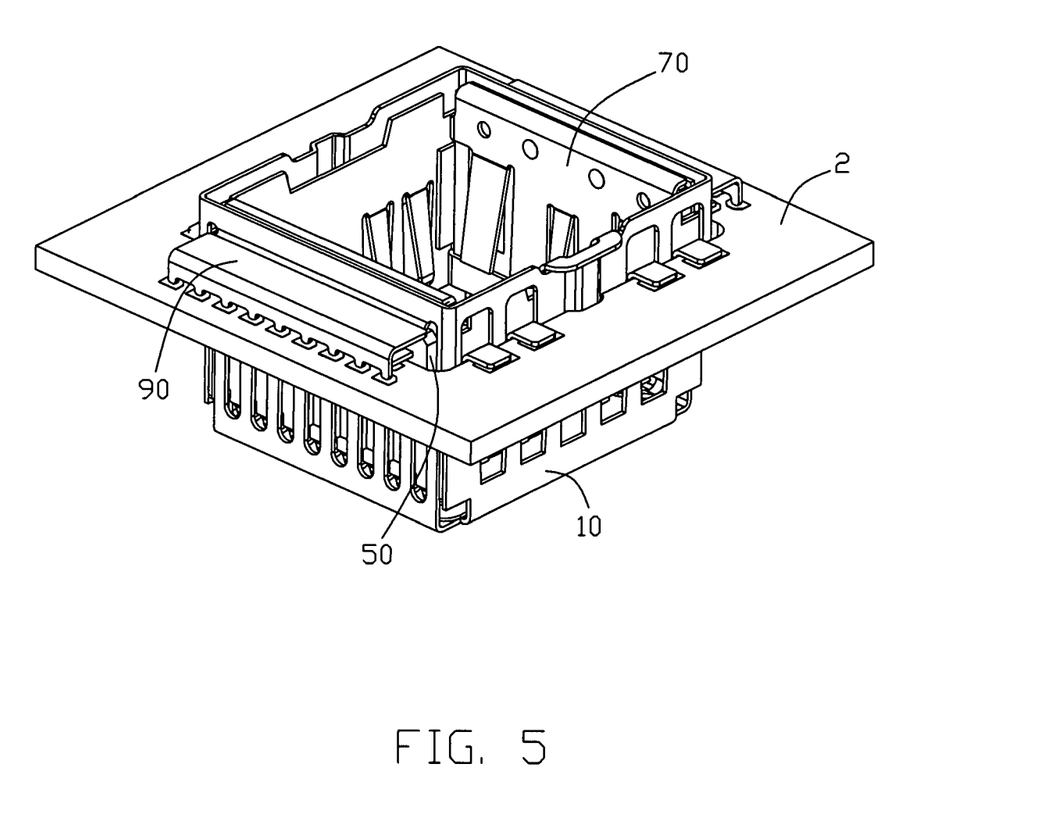
FIG. 5 is a perspective view of the shield connector of the present invention, wherein the moveable shell assembled on the electrical connector from above and the soldering assembly disposed on the top position of the electrical connector.
Figure 6:
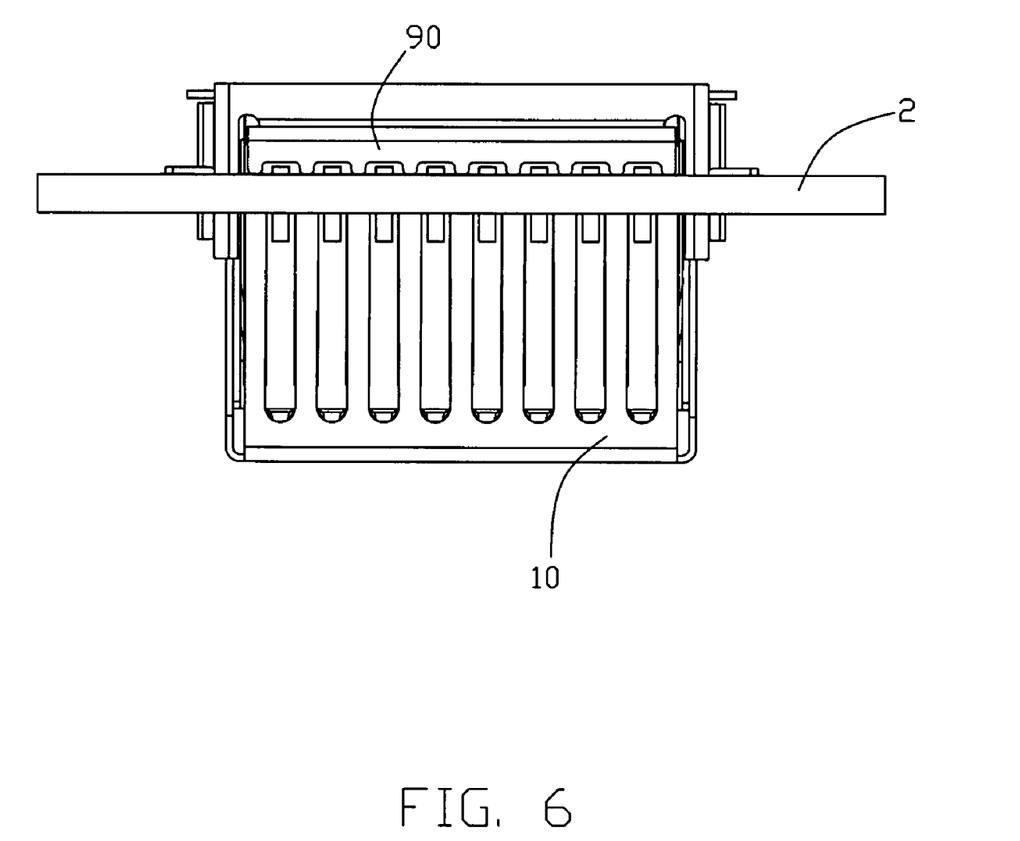
FIG. 6 is a front view of the shielded connector shown in the FIG. 5.
Figure 7:
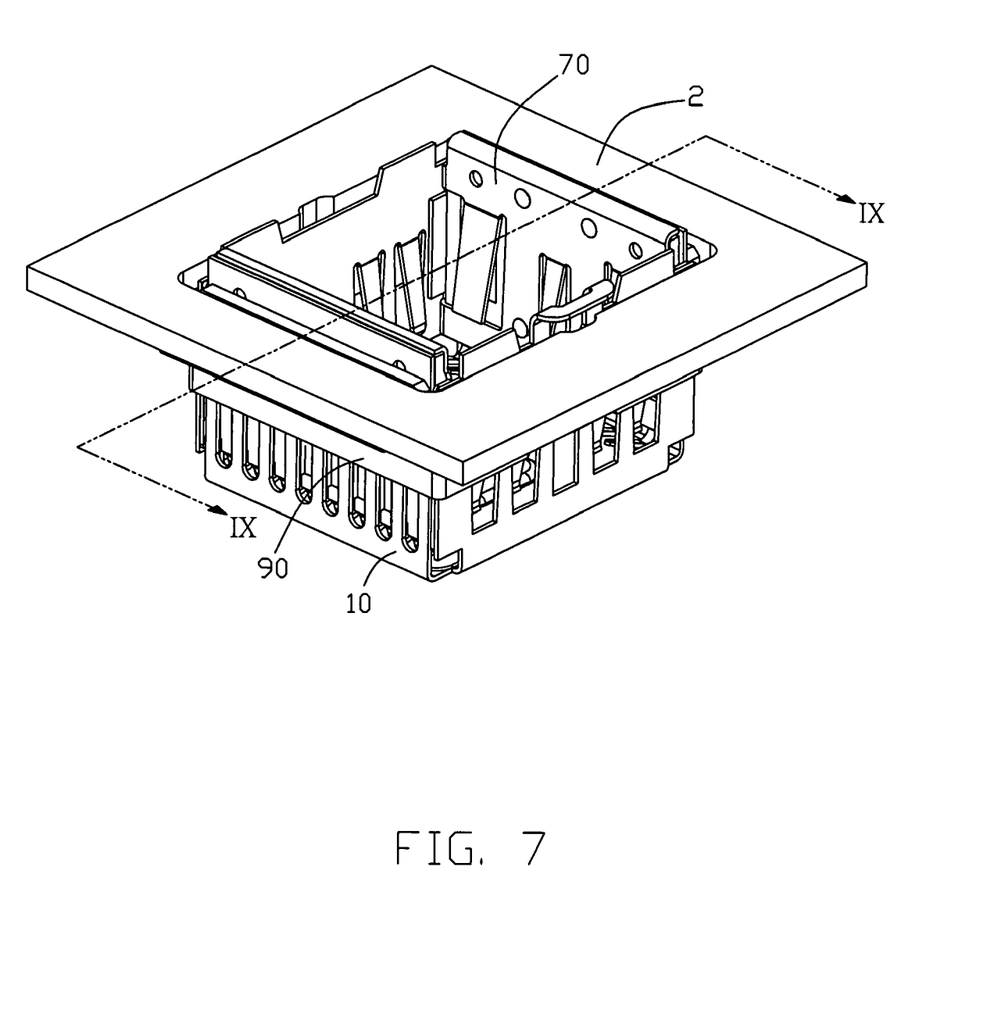
FIG. 7 is a perspective view of the shield connector of the present invention, wherein the movable shell assembled with the housing from below and the soldering assembly disposed on the top position of the electrical connector.
Figure 8:
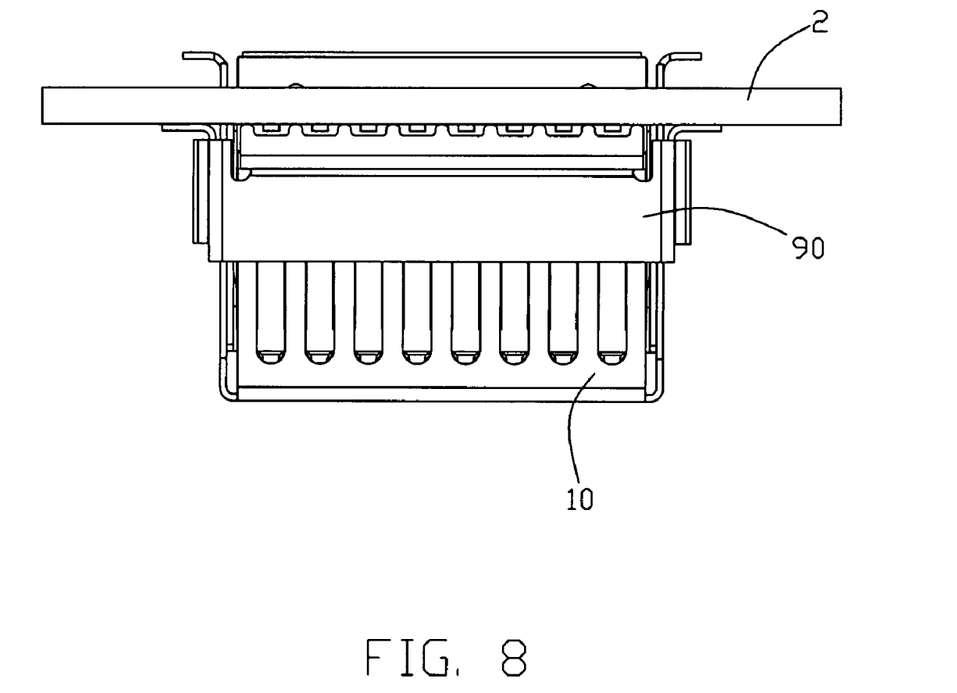
FIG. 8 is a front view of the shield connector shown in the FIG. 7.
Figure 9:
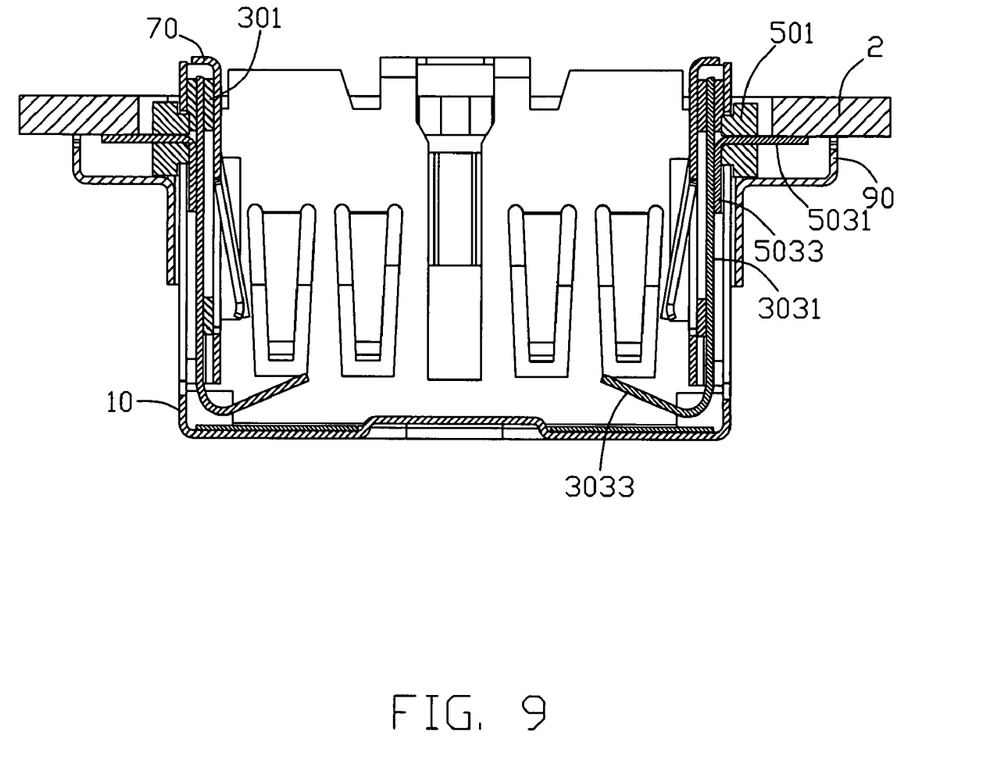
FIG. 9 is a section view of the shield connector shown in the FIG. 7 taken along the line IX-IX.
Figure 10:
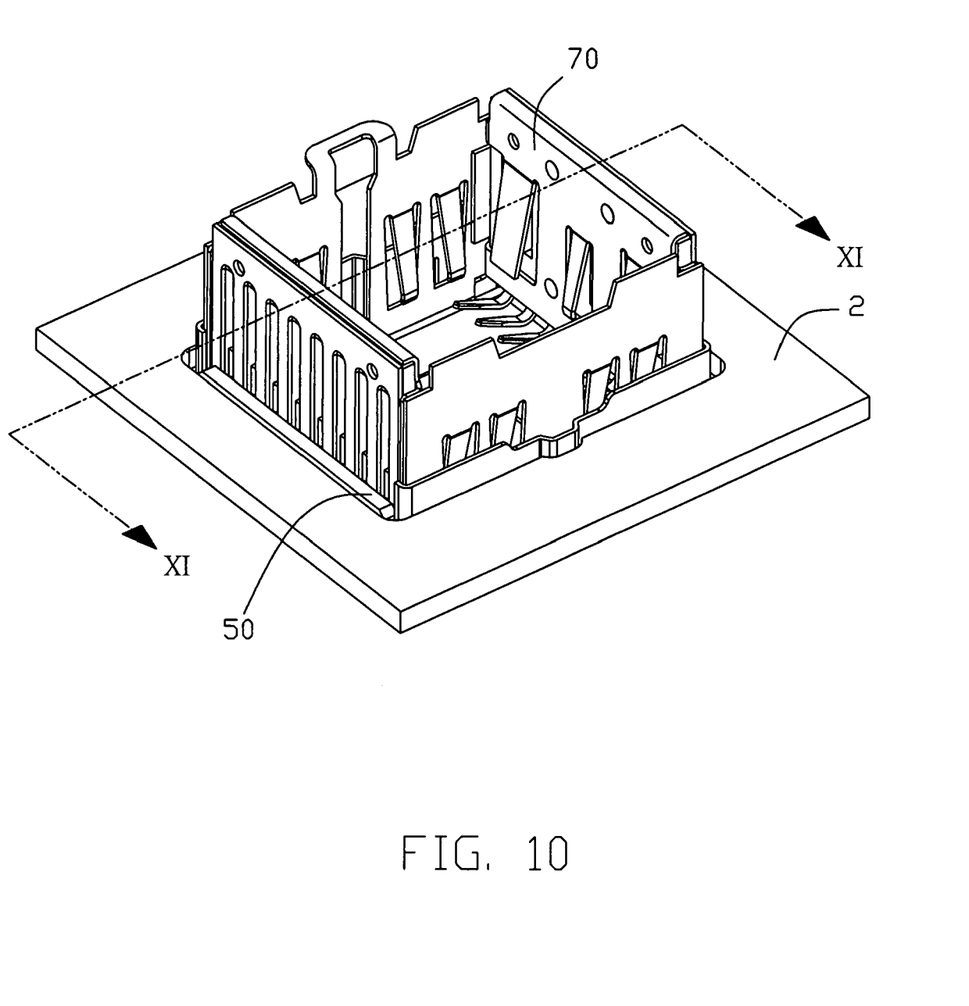
FIG. 10 is a perspective view of the shield connector of the present invention, wherein the movable shell assembled with the housing from below and the soldering assembly disposed on the below position of the electrical connector.
Figure 11:
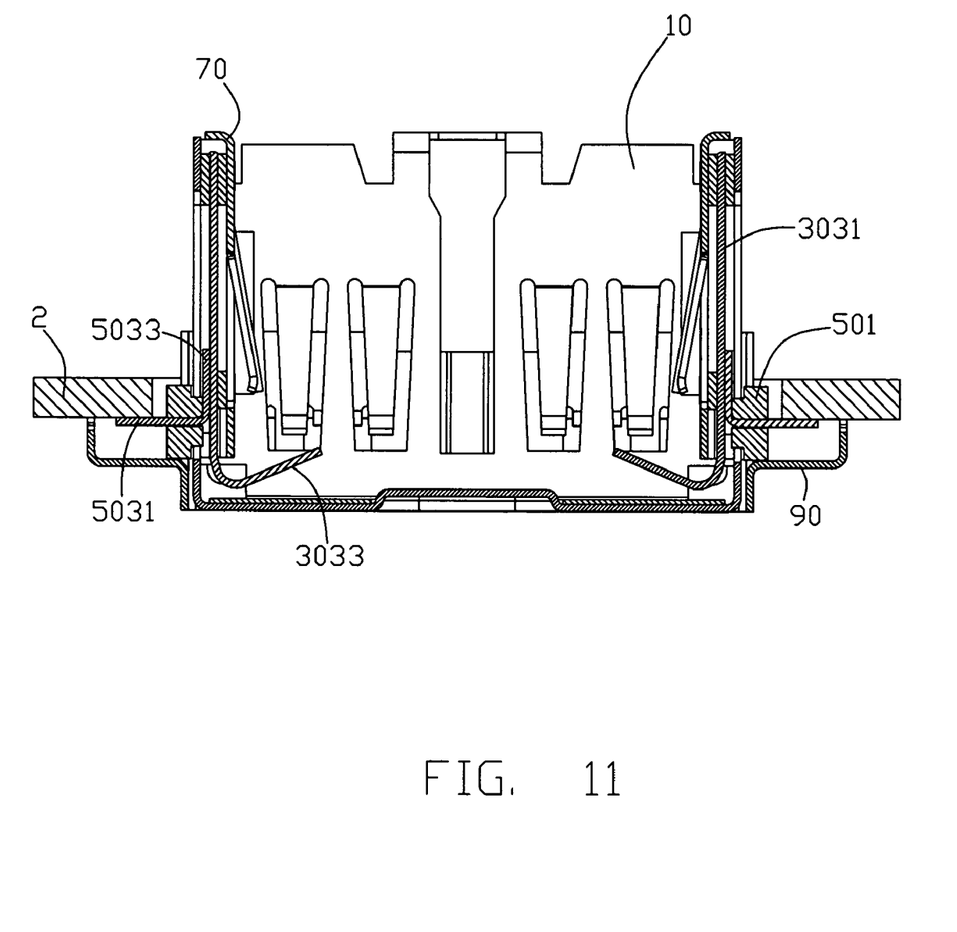
FIG. 11 is a second view of the shield connector shown in the FIG. 10 taken along the line XI-XI.

Also please referring to the FIGS. 1-3 and combine to the FIGS. 4, 9, 11, the contact module 30 includes an insulating part 301and a plurality of terminal contacts 303 insert-molded into the insulating part 301. A plurality of contact inserting slots 3011 is defined in the insulating part 301 and penetrates the insulating part 301 along the thickness direction. Said contact inserting slots 3011 are located on a corresponding position with the narrow opening 1011 of the housing 10. In additional, several ribs 3013 are formed on one surface of the insulating part 301 to engage with the shielded piece 70.

Each terminal contact 303 includes a base portion 3031 extending perpendicular and a contact portion 3033 disposed above the bottom plate 100 of the housing10. Each terminal contact 3033 is attached to the insulating part 303 with the base portion 3031 insert-molded into the insulating part 301. Moreover, the width of the base portion 3031 is broader than the contact portion 3033 to increase the resilient property of the contact portion 3033.

It can be noted that said terminal contact 303 only has a base portion 3031 and a contact portion 3033 and does not has a soldering portion connected with a printed circuit board 2. The reason will be described in the following paragraphs.

Also please referring to the FIGS. 1-3 and combine to the FIGS. 4, 9, 11, the soldering assembly 50 attached to the contact module 30 and comes to solder with the printed circuit board 2, which comprising a plurality of soldering member 503 and a holding member 501 for fixing said soldering member 503. As shown in the FIGS. 1-3, 9, 11 especially, each soldering member 503 configured as an L-shape configuration, comprising an attaching portion 5033 attached to the terminal contact 303 and a soldering portion 5031 to be soldered to the printed circuit board 2. As a result, the soldering member 503 can be attached to the terminal contact 303 at any position within the range so as to meet with the different demands of the mobile phone. By the provision of the current invention, it is not necessary to use a different electrical connector with the different demand of the mobile phone. In other word, present electrical connector can be applied in different mobile phones.

Also please referring to the FIGS. 1-3, the shield pieces 70 cover on the contact module 30 separately and made of a metal sheet. A plurality of locking fingers 701 extends slantly away an inner surface thereof. A plurality of aligning holes 703 is formed corresponding to the ribs 3013 of the insulating part 301, by which the shield pieces 70 and the insulating part 301 are assembled together. Additional, a pair of wings 705 are formed on the two side ends of each shield piece 70, which perpendicular to the surface of the shield piece 70 so as to make the wing 705 attach to a corresponding portion of the inner surface of the surrounding wall plate 102, 104.

The shield connector 1 further includes a movable shell 90 attached to the housing 10 and soldered with the printed circuit board 2. It is bent from a metal sheet to a rectangle shape and is composed of four walls 901. The inner surface of the walls 901 abuts against the outside surface of the housing 10. A plurality of soldering pads 903 are formed on the top or below end of the walls 901 of the movable shell 90 and extends outwardly thereof so as to contact with the electrically pads formed on the printed circuit board 2. It can be noticed that, in the FIG. 1, the movable shell 90 is a rectangular configuration; while it is all right that the movable shell 90 is composed of a pair of metal shell. When the movable shell 90 assembled with the housing 10, they are assembled together by spot-welding at the position, which the wings 703 of the shielded piece are located.

Referring to FIGS. 1-11, in assembly, firstly, the terminal contacts 30 are insert-molded into the insulating part 301 with the base portion 3031 being set in the contact insert slots 3011 thereof, by which the contact module 30 are assembled together; secondly, the shield piece 70 covered on the contact modules 30 with the ribs 3013 of the insulating part 301 being inserted into the aligning holes 703 of the shield piece 70; thirdly, the shield pieces 70 and the contact module 30 are together mounted on the first and third surrounding wall plate 101, 103 of the housing 10 separately with the wing 705 resisting the inner surface of the second and fourth surrounding wall plate 102, 104 of the housing 10 and the contact portion 3033 of the terminal contact 303 disposed above the bottom plate 100 of the housing 10; fourthly, the soldering assembly 50 are anchored on the outer surface of the first and third surrounding wall plate 101, 103 and contacts to the terminal contact 303 with attached portion 5033 thereof attached to the base portion 3031 of the terminal contact 303 via the narrow opening 1011 and the soldering portion 5031 extending outward from the housing 10 so as to connect to the printed circuit board 2; finally, the movable shell 90 covered on the outer surface of the housing 10 from above/below and the inner surface of the wall of the movable shell 90 against with the outer surface of the housing 10, meanwhile, the soldering pads 903 located on a same height of the soldering portion 5031 of the soldering assembly 50 so as to provide a steady electrical connection between the shield connector 1 and the printed circuit board 2.

It can be noticed that, in the above description, the movable shell 90 assembled with the housing 10 from above, while it is all right that the movable shell 90 assembled with the housing 10 from below as shown in FIGS. 7-11. It is the key factor that how to make the movable shell 90 attach to the housing 10 firmly. For example, if the soldering portion 5031 of the soldering assembly 50 located on a position adjacent to the upper portion of the first and third surrounding wall plate 101, 103, the movable shell 90 assembled with the housing 10 from the below and the soldering pads 903 of the movable shell 90 located on the upper edge thereof, because the movable shell 90 hardly contacted with the housing 10 firmly if it assembled with the housing 10 from above. On the contrary, if the soldering portion 5031 located on a position adjacent to the lower portion of the first and third surrounding wall plate 101, 103, the movable shell 90 assembled with the housing 10 from above.

In the above description of the preferred embodiment, a contact section and a soldering section of the terminal contact located on separate elements, in other word, the contact portion for coming to contact with the pads formed on the bottom surface of the camera module defined in the terminal contact and the soldering portion for connecting with the printed circuit board 2 defined in the soldering assembly. Consequently, the soldering section can be attached to any position of the terminal contact so as to satisfy the different demand of the mobile phone.

It is to be understood, however, that even though numerous, characteristics and advantages of the present invention have been set fourth in the foregoing description, together with details of the structure and function of the invention, the disclosed is illustrative only, and changes may be made in detail, especially in matters of number, shape, size, and arrangement of parts within the principles of the invention to the full extent indicated by the board general meaning of the terms in which the appended claims are expressed.

What is claimed is:

1. A shield connector assembly comprising:
   a housing configured by a bottom wall and periphery sidewalls defining a receiving space therebetween;
   a pair of contact modules securely attached to an opposite periphery sidewalls of the housing, and each at least having a plurality of terminal contacts each defining a contact engaging portion extending from a base portion of the terminal contact and toward a center of the receiving space of the housing;
   a soldering assembly adjustably attached to a outer surface of the housing and in contact with the terminal contact for connecting with a printed circuit board.

2. The shield connector assembly according to claim 1, wherein the soldering assembly at least includes a soldering member which includes at least a portion for interconnecting to the terminal contact and a soldering portion for electrically connecting to the printed circuit board.

3. The shield connector assembly according to claim 2, wherein the shield connector further comprises a shell movably attached to the housing and has at least an electrical pad which have a same height with the soldering portion of the soldering assembly.

4. The shield connector assembly according to claim 3, wherein a plurality of apertures are formed on the sidewall of the housing, via which the soldering member connected to the terminal contacts.

5. The shield connector assembly according to claim 4, wherein the shield connector further includes a pair of shielded pieces covering on the contact module, each at least having a wing extending from the side end thereof and against with the sidewall of the housing, while the housing and the shielded piece assembled together by spot welding on the position there said wing located.

6. The shield connector assembly according to claim 5, wherein each contact module further includes a contact holding made of insulating material and the contact engaging portion being bent toward the center after the contact assembled into the contact holding.

7. The shield connector assembly according to claim 1, wherein said soldering assembly is selectively position at least two different vertical positions with regard to the housing so as to adjust a relative vertical position with regard to said printed circuit board to which said connector is mounted.

8. The shield connector assembly according to claim 7, wherein an outer movable shell cooperating with the soldering assembly, is assembled to the housing and defines a plurality of mounting pads seated upon one surface of the printed circuit board.

9. The shield connector assembly according to claim 8, wherein the soldering assembly includes a plurally of soldering portions which are either on the same surface of the printed circuit board with the mounting pads or on an opposite surface of the printed circuit board with the mounting pads.

10. A shielded electrical connector adapted for mounting at different profiles, comprising:
    a metal housing having a first and second opposite walls, and a bottom wall interconnected the first and second opposite walls and jointly defining space therein, the first opposite wall each defining a plurality of slots extending from a lower end to an upper end;
    a pair of contact terminal inserts each attached to the first opposite walls from inside of the housing, each insert including a plurality of contact terminals integrally formed with insualtive material, and each contact terminal including a base portion substantially free from insulative material and in align with the slot defined in the first opposite walls; and
    a pair of tail inserts electrically interconnected to the contact terminal insert from outside of the first opposite walls, each including a finger extending through the slot of the first opposite walls, and in electrically contact with the base portion of the contact terminal of the con tact terminal insert.

11. The shield connector assembly according to claim 10, wherein each of the tail insert further including a solder portion substantially orthogonal to the finger thereof.

12. The shield connector assembly according to claim 11, wherein a free end of the finger of the tail insert can be directed downward such that the solder portion can be located in a position closest to an upper edge of the first opposite wall for a first application.

13. The shield connector assembly according to claim 11, wherein a free end of the finger of the tail insert can be directed upward such that the solder portion can be located in a position away from an upper edge of the first opposite wall for a second application.

14. The shield connector assembly according to claim 10, wherein a metal bracket is used to substantially shielding the contact terminal insert disposed on inner side of the first opposite walls.

15. The shield connector assembly according to claim 10, further including an outer shell movably enveloped onto the housing at a selected position and substantially surrounding the tail inserts.

16. The shield connector assembly according to claim 15, wherein the outer shell can be disposed on a first position closest to the upper edge of the housing and a second position closest to the lower edge of the housing.

17. A shield connector adapted for mounting at different profiles with respect to a printed circuit board on which the shield connector seats, comprising:

a housing defining a receiving space;

a pair of contact modules mounted on the housing, each at least having a plurality of terminal contacts therein;

a soldering assembly adjustably attached to housing for adjusting its position respect to a top of the housing, and including a portion in contact with the terminal contacts; and a shell movably attached to an outer surface of the housing, and having a solder pad for interconnecting with the printed circuit board.

18. The shield connector assembly according to claim 17, further includes a pair of terminal contact holding members and each of terminal contacts defines a contact engaging portion, which has been bent to a center of the receiving space after the terminal contact assembled on the terminal contact holding member.

19. The shield connector assembly according to claim 18, further includes a pair of shield pieces covering on the contact modules, each at least defines a skirt portion located on a side end thereof and against with corresponding sidewall of the housing.

20. The shield connector assembly according to claim 19, wherein the shield pieces and the housing assembled together by spot welding on the position where the shirt portion located.

* * * * *